United States Patent [19]

Shepley

[11] Patent Number: 4,934,351

[45] Date of Patent: Jun. 19, 1990

[54] FABRICATING INTERNAL COMBUSTION ENGINE CYLINDER HEADS WITH CLOSE TOLERANCE INTERNAL SURFACES

[75] Inventor: Barry E. Shepley, Windsor, Canada

[73] Assignee: Ford Motor Company, Dearborn, Mich.

[21] Appl. No.: 450,715

[22] Filed: Dec. 14, 1989

Related U.S. Application Data

[62] Division of Ser. No. 280,797, Dec. 7, 1988, Pat. No. 4,896,638.

[51] Int. Cl.⁵ .............................................. F02F 1/00
[52] U.S. Cl. .......................... 123/193 CH; 123/188 S; 123/188 GC
[58] Field of Search ...... 123/188 S, 188 GC, 193 CH

[56] References Cited

U.S. PATENT DOCUMENTS 4,342,293  8/1982  Nickerson .................... 123/188 GC
4,570,585  2/1986  Hayashi .......................... 123/188 S Primary Examiner—E. Rollins Cross
Attorney, Agent, or Firm—Joseph W. Malleck; Roger L. May

[57] ABSTRACT

An internal combustion engine which is provided with a cylinder head structure possessing truer finished surfaces and which incorporates unsmeared porosity in such surfaces to act as reservoirs for lubrication; as a result the design gap with the valve stem can be closer for improved lubrication.

3 Claims, 5 Drawing Sheets

FABRICATING INTERNAL COMBUSTION ENGINE CYLINDER HEADS WITH CLOSE TOLERANCE INTERNAL SURFACES

This is a division of Ser. No. 280,797, filed 12/7/88, now U.S. Pat. No. 4,896,638.

BACKGROUND OF THE INVENTION

1. Technical Field

The invention relates to the art of machining internal combustion engine cylinder heads and, more particularly, to the art of grinding or coring valve seats and valve guides for such heads.

2. Description of the Prior Art

Valve seat machining or coring is a well established art which consistently has used a tool pilot fitting into a completed guide opening (for the stem of a valve associated with the valve seat) thereby to align the cutting tool for concentrically machining or reboring the valve seat (see U.S. Pat. Nos. 3,674,375; 3,764,204; 4,147,462; and 4,545,706). U.S. Pat. No. 4,545,706, in particular, compounds the problem of alignment by using the wrong sequence and aligning the seat somewhat independent of the guide bore. This patent sizes the guide bore and locates its axis prior to independently sizing and locating the valve seat. Although a reaming tool for the valve guide and a cutting tool for the valve seat are mounted on a common spindle head, the head articulates about a universal joint to allow the reaming tool to complete boring of the guide bore in advance of the valve seat. Thus, when cutting the valve seat, a bearing cradle aligns the head eliminating guidance by the guide bore.

Due to the surface finish of such reboring, cutting or reaming action, a facing operation must be carried out to grind the valve seat, and sometimes the guide bore, to a tolerable surface finish (see German patent No. 876,959; U.S. Pat. Nos. 1,906,263; 1,981,269; 2,150,621; and 2,363,384).

Unfortunately, all of the above disclosures have not only been limited by the ability to machine only the valve seat in one pass of the tool holder and to machine the guide bore in another separate pass, but also have been limited by the relatively rough shape of the wrought metal seat and bore inserts, requiring cutting of the final seat or bore surface to general size and location followed by finish machining of such surfaces to complete the sequence. A large amount of metal material must be removed in the first stage of the sequence of this art, necessitating slower machining speeds (both rotary and feed) for less than optimum productivity. The valve seat obtains only a macroscale alignment with respect to the valve guide (macroscale is defined herein to mean a dimensional tolerance where the units of dimensional difference are no closer than 0.01 inch). To reduce wear and to deploy lubrication better, there is a great need for closer tolerances than exist on a macroscale.

Deploying lubrication better is a related problem. Fully dense wrought metal inserts, used by such art for the seat and stem guide sleeve, are of a harder material than the remainder of the cylinder head but suffer from replenishment of the lubricant throughout the totality of the interfacing surfaces. There is a lack of optimal lubrication at the interface between the moving valve head and the fixed seat insert, and a lack of optimal lubrication in the space or gap between the moving valve stem and the fixed guide sleeve. The use of multiple stages of machining of the same surfaces also eliminates any hope for controlled porosity in such surfaces.

SUMMARY OF THE INVENTION

A primary object of this invention is to provide a method which improves the quality and productivity of fabricating cylinder heads. Productivity is increased not only by reducing the number of machining passes, but also by increasing the rotary and feed speeds of a pass. Quality is improved by more accurately sizing and locating the machined surfaces.

Another object is to provide a cylinder head structure possessing truer finished surfaces and which incorporates unsmeared porosity in such surfaces to act as reservoirs for lubrication; as a result, the design gap with the valve stem can be closer for improved lubrication.

The method aspect of this invention attains the goal of the primary object by the following steps: (a) forming a cast cylinder head with a passage having implanted in the walls of such passage a valve stem guide sleeve insert and a valve seat insert, said inserts being formed of fused powder metal and each having an internal cylindrical surface prepared to near net shape no longer requiring macroscale sizing; and (b) microsizing both internal cylindrical surfaces by a single pass of a rotary abrasive tool inflexible along its axis and supported for accurate alignment independent of the guide sleeve.

The cylinder head may first be formed with a recess for a valve seat insert and a guide bore for a guide sleeve; preshaped independent inserts are then respectively press-fit into such recess and guide bore, the inserts being formed of fused powder metal and each having an internal cylindrical surface prepared to near net shape no longer requiring macroscale sizing. Alternatively, the cylinder head may be cast with such inserts in place using techniques to insure high locational accuracy. Near net shape is used herein to mean an oversize tolerance of about plus 0.002–0.003 inches; consistent with this, macroscale means measurements in increments or units greater than 0.01 inches.

Microsizing can be carried out at rotary speeds of 2500 rpm or greater and at feed rates in the range of 0.006–0.075 inches per revolution. This far exceeds conventional finish machining of the prior art which is carried out at no greater than 1200 rpm and at feed rates not substantially exceeding 0.003 inches per revolution.

Preferably, a substantial portion of the microsizing for both internal cylindrical surfaces is carried out simultaneously. Advantageously, preshaping of the inserts to near net shape is carried out during hot sintering of the inserts. Microsizing may be carried out by the use of abrasive tooling having a grit size in the range of 80–150. Microsizing of the valve seat insert may be carried out by use of a rotary honing member having circumferentially separated abrading pads, each pad being at a different angular orientation with respect to the axis of the tool thereby to form a compound surface for the valve seat.

The apparatus aspect of this invention attains the second object by being comprised of: (a) a head structure having at least one gas passage provided with a recess for a valve seat insert and a guide bore for a guide sleeve insert; (b) sintered Powder metal inserts implanted respectively into said valve seat recess and into the guide bore, the internal cylindrical surfaces of the inserts being true with respect to each other within a locational tolerance of 0.001–0.002 inches (about 0.04 millimeters) and finished to a surface accuracy within a tolerance of 0.001–0.002 inches, each of the internal cylindrical surfaces having open porosity that constitutes 5–22% by volume of the surface area; and (c) means to introduce lubricant to the internal cylindrical surfaces of the inserts whereby the porosity in said surfaces may act as reservoirs for constant lubricant supply. Preferably, the head is cast of an aluminum or aluminum alloy and the inserts formed of iron-based powder metal having a coarse average particle size in the range of 30–90 microns.

DETAILED DESCRIPTION AND BEST MODE

Figure 1:
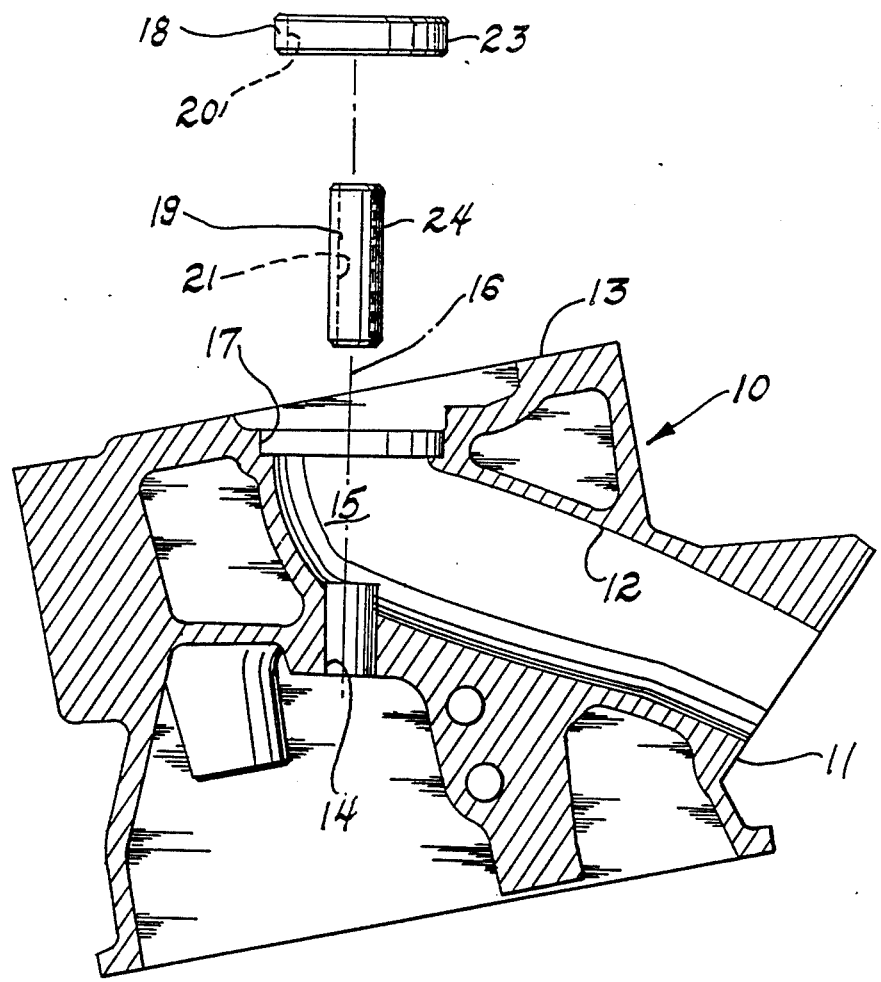
FIG. 1 is an exploded view illustrating the line of fitting of the inserts into a cylinder head.
Figure 2:
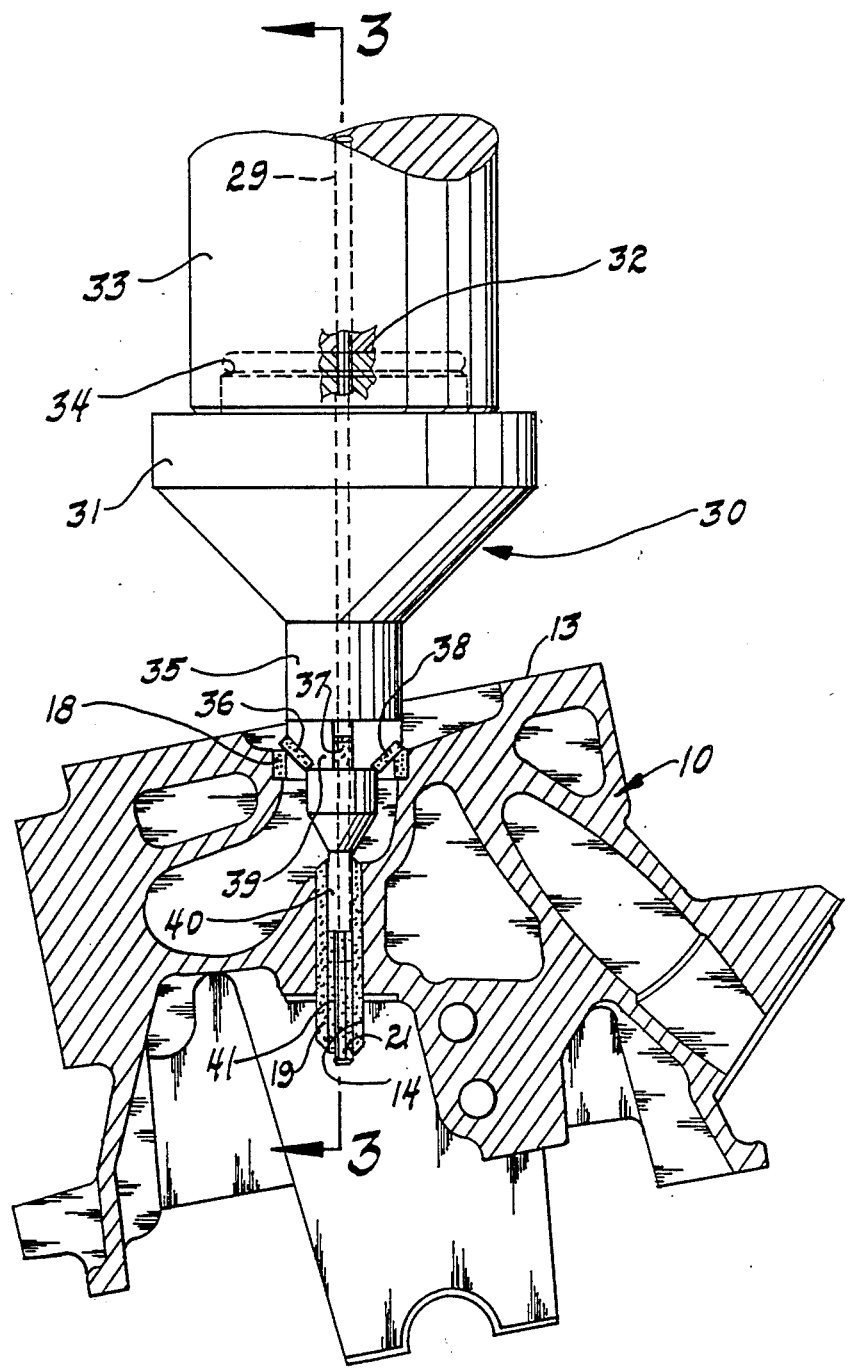
FIG. 2 is a diagramatic and partially sectional view showing one position of the microsizing tool used to complete sizing of the guide bore and valve seat of a cylinder head, taken along line 2—2 of FIG. 3.
Figure 3:
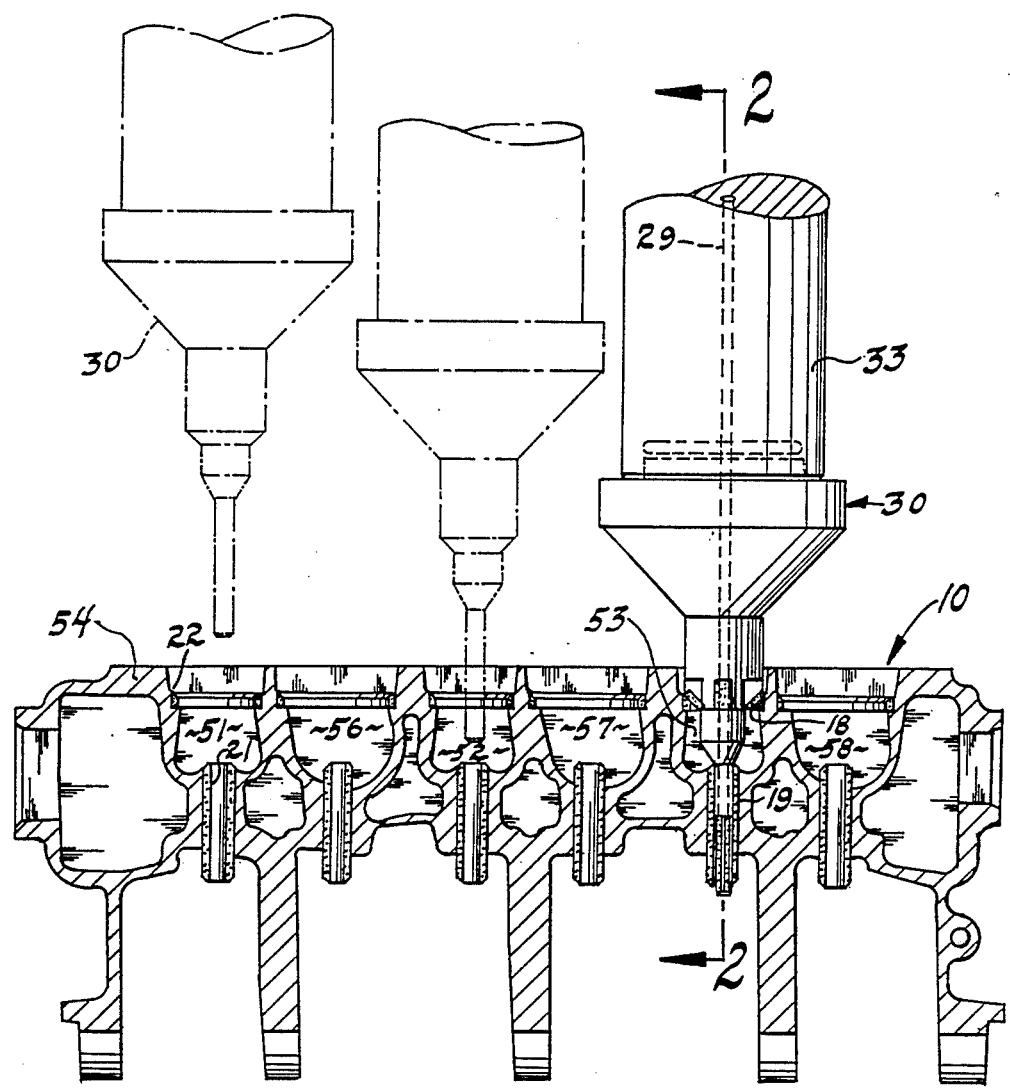
FIG. 3 is a sectional view of one bank of cylinders of a cylinder head and a diagramatic view of the microsizing tool in various stages of use, the section being taken along line 3—3 of FIG. 2.

As shown in FIGS. 1–3, the cylinder head 10 is a cast structure shaped to have characteristic intake and exhaust gas paths; each path may comprise a channel 12 extending from a parting planar surface 13, for mating with an engine block, to a side wall 11. A guide bore 14 is formed to intersect the channel 12. Part of the channel 12 and the guide bore 14 together form what herein is referred to as a passage 15 for receiving a valve (not shown) which operably reciprocates therein An annular recess 17 is defined at the mouth of each channel 12.

Shown in FIG. 1, an annular recess 17 is machined into the mouth of channel 12 and the guide bore 14 is machined to achieve a more accurate bore, all subsequent to casting. This locates and sizes the annular recess 17 and guide bore 14 to macroscale tolerances not only along an axis 16 but locationally with respect to each other. Thereafter, independently formed powder metal inserts 18 and 19 are press-fit into such recess and bore respectively. When the inserts are press-fit into the casting, the outer cylindrical surfaces (23–24) will have been preshaped to a tolerance of ±0.001–0.002 inches and the receiving recess and bore will have been machined to a tolerance of ±0.001–0.002 inches, both mating surfaces being designed to provide an interference fit. The interference fit is about 0.0016 inch for the guide sleeve insert and about 0.003 inches for the seat insert.

Alternatively, the cylinder head may be cast with the near net shape inserts 18 and 19 in place as implants in the respective walls of such recess and bore. Techniques are available to locate the inserts to desired locational macroscale accuracy by use of pins, chaplets, or magnets.

The cylinder head may be preferably formed of a light metal (i.e., Al, Ti, Mg) by casting techniques which may comprise semipermanent mold, green sand molding, evaporative pattern or die casting. For purposes of the best mode herein, such head is cast by semipermanent molding and is comprised of an aluminum alloy (AA333) containing, by weight, 6–7% silicon, 0.8% Fe, 3–4% Cu, 0.5% Mn, 0.1–0.5% Mg, 0.5% Ni, 1.0% Zn, 0.25% Ti, with the remainder essentially aluminum.

Porosity is percent by volume and is determined on an automatic image analysis system using a unit measurement area of 20.9 mm$^2$.

The preshaped valve seat insert 18 is formed by sintering techniques from powder metal, preferably atomized iron powder having a coarse average particle size in the range of 30–90 microns. The insert 18 is shaped to have an internal surface 20 prepared to near net shape no longer requiring macroscale cutting or shaping. Near net shape is used herein to mean an oversize tolerance of plus 0.002–0.003 inches (thereby making the inner opening smaller) For example, the inner surface 20 as well as the array of seat surfaces 22 of insert 18 will be oversized from the final useful shape by only 0.002–0.003 inches. The diametrical outer surface 23 will be within 0.001–0.002 inches of the machined diameter of recess 17. The powder metal insert 18 will have a density in the range of 85–95% while providing porosity of 5–15% at the inner surface 20 as a result of the use of coarse powder.

Similarly, the valve stem guide sleeve 19 is formed by powder metallurgy techniques to have an internal cylindrical surface 21 formed to near net shape controlled to an oversize tolerance of plus 0.002–0.003 inches; such sleeve is formed to a density in the range of 78–90%, which incorporates 10–22% porosity at the inner cylindrical surface 21. The external surface 24 is formed to a tolerance of +0.002–0.003 inches of the machined diameter of bore 14.

Making the powder metal inserts can be accomplished by sintering techniques as shown in U.S. Pat. Nos. 4,270,951; 4,092,223; 4,090,874; and 4,069,044.

Figure 4:
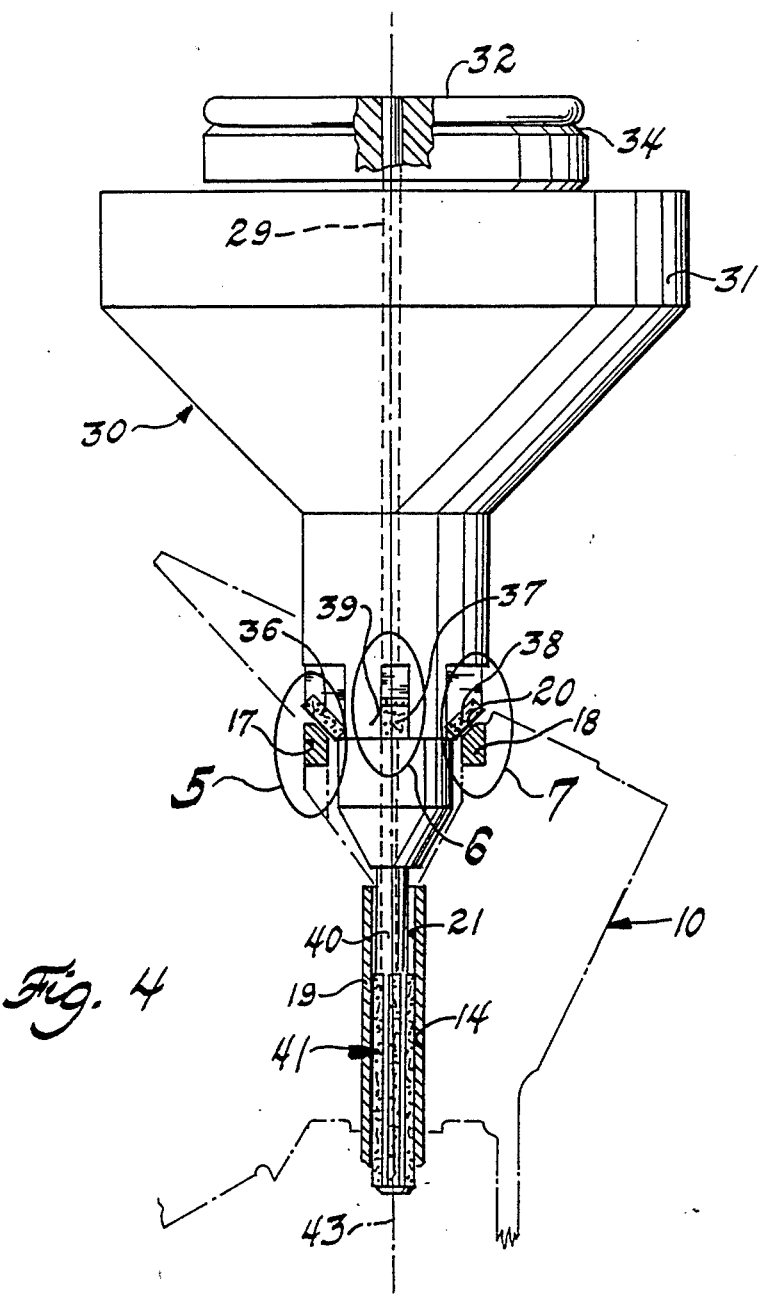
FIG. 4 is a slightly enlarged view of the microsizing tool shown in a position just prior to machining the valve seat.

As shown in FIGS. 2 and 4, the microsizing tool 30 comprises a holder 31 attached at 34 to a spindle 33. The spindle is supported in suitable bearings or tracks thus for accurate support of the holder at one end 32. The holder 31 has an extension arm 35 carrying a plurality of circumferentially spaced abrading pads 36,37,38 along a conical shoulder 39, the conical shoulder being oriented to generally mate with the array of internal surfaces 20 of the valve seat insert for carrying out microsizing. Extending coaxially from the arm is a finger 40 of suitable diameter to extend the abrasive segments 41 snuggly into the interior of guide bore 14. Abrasive sleeve segments 41 are bonded or secured to the outer surface of the finger to carry out microsizing of the interior surface 21 of the guide sleeve 19. Machining fluid is carried centrally through the tool 30 via a passage 29 to be introduced through radial ports for sweeping away machined grit.

The abrasive pads 36,37,38 and abrasive sleeve segments 41 may be formed with a coating of diamond crystals, diamond-like graphite, or cubic boron nitride crystals. The circumferentially separated pads for the valve seat are each preferably oriented at a different angle with respect to the axis 43 of the microsizing tool 30 so as to contact and microsize a different part of a compound surface 20 of the valve seat insert. This is shown more clearly in the series of FIGS. 3–5.

Figure 5:
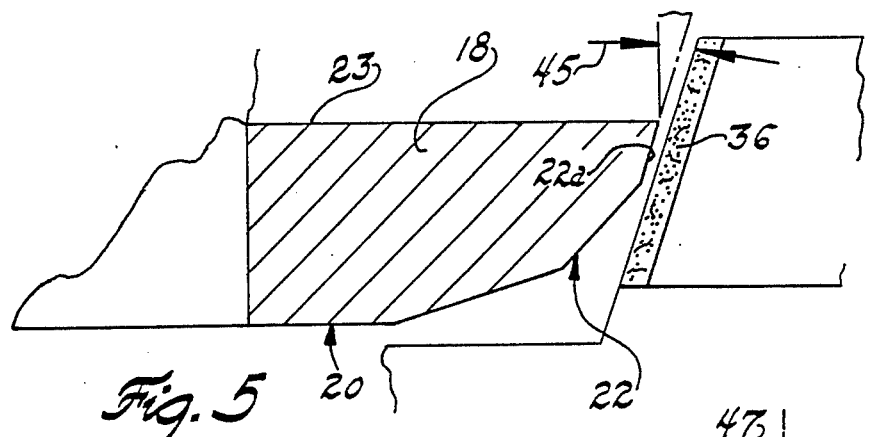
FIGS. 5–7 are fragmentary views of portions of the microsizing tool and valve seat showing the different abrasive pads used to size the compound surfaces of the valve seat.
Figure 6:
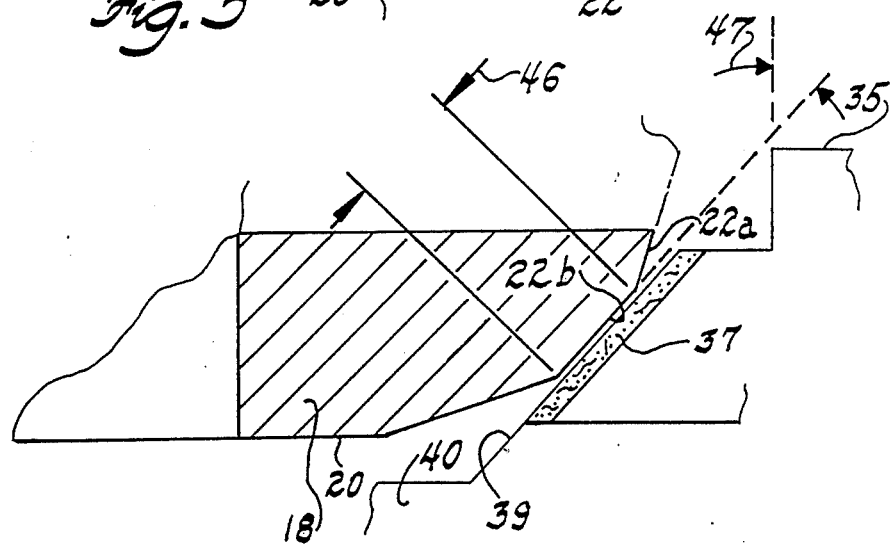
Figure 7:
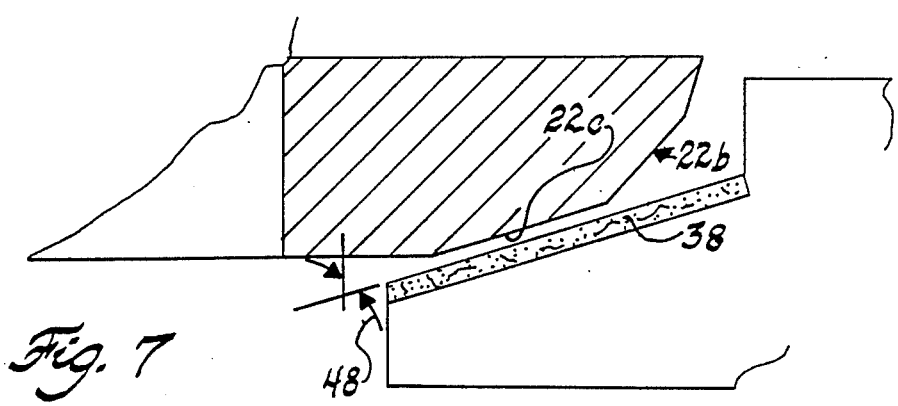

In FIG. 5, pad 36 is oriented to microsize surface array segment 22a of the insert 18 which is at an angle 45 of about 15° with the surface 13 of the head. As shown in FIG. 6, pad 37 is oriented to microsize surface 22b, having a lateral dimension 46 of about 0.05 inches, disposed at an angle 47 of about 40° with surface 13 of the head. As shown in FIG. 7, pad 38 is oriented to microsize surface segment 22c at an angle 48 of about 75°.

Using such forming and microsizing technology, the method herein comprises: (a) forming a cylinder head 10 with a passage 15 having a recess 17 for a valve seat insert 18 and a guide bore 14 for a guide sleeve 19; (b) press-fitting a preshaped valve seat insert 18 into the recess and a preshaped valve stem guide sleeve into the guide bore, the inserts being formed of fused powder metal and each having an internal cylindrical surface (20, 22 and 21, respectively) prepared to near net shape no longer requiring macroscale sizing; and (c) utilizing a microsizing tool 30 to finish the internal cylindrical surfaces (20, 22 and 21) by use of a single pass of such tool. The tool is inflexible along its axis and is supported for accurate alignment independent of the guide sleeve.

Microsizing is not machining because machining can only size parts to a macroscale, in units greater than 0.01 inches. By having the inserts preshaped to near net shape, the squared shape and large material, associated with prior art, need not be removed. The microsizing tool can be operated at rotary speeds exceeding 2500 rpm and feed rates 0.006–0.075 inches/revolution. Prior art machining of valve seats and guide bores is usually limited to 1200 rpm and 0.003 inches/revolution of feed.

As shown in FIG. 3, the inserts 18 and 19 for each of the several intake passages 51, 52 and 53, aligned along a bank 54 of the cylinder head 10, are microsized by first inserting the tool 30 into intake passage 51 to complete shaping of the internal surfaces 21 and 22, and sequentially withdrawing tool 30 from such passage 51 and inserting the same tool 30 into intake passages 52 and 53. To microsize the exhaust passages 56, 57 and 58, a separate tool, shaped for the surfaces of the seat and guide sleeve needed for these passages, is used. Both tools, for the intake and exhaust passages, may be mounted on a single support in tandem and used to microsize one pair of intake and exhaust passages in one pass. By properly sizing the length of the abrading segments 41, a substantial portion of the guide sleeve surface 21 can be microsized simultaneous with the microsizing of seat surfaces 22.

Closer tolerance finishing of the seat and guide sleeve is made possible by eliminating macroscale machining of surface 21 and 22 by conducting only microsizing at higher speeds and unitary rigid spindle support for both surfaces during a single pass. The gap between the outer surface of a valve stem and the guide sleeve surface 21 can be designed to a narrower dimension, such as 0.0005–0.001 inches, which is considerably smaller than prior art gaps equal to or greater than 0.002–0.003 inches. Thus, porous surface 21 can more effectively operate as a lubricant reservoir for such thinner spacing between valve and guide sleeve.

The resulting cylinder head produced by such process is characterized by the following structural combination: (a) a head structure which has at least the one gas passage provided with a recess for a valve seat insert and a guide bore for a guide sleeve insert; (b) sintered powder metal inserts implanted respectively into said valve seat recess and into said guide bore, the internal cylindrical surfaces of the inserts being true with respect to each other within a locational tolerance of 0.002–0.003 inches, the internal surfaces of said inserts having open porosity that constitutes 5–22% by volume at said surface area; and (c) means to introduce lubricant to the internal cylindrical surfaces of the inserts whereby the porosity in the surfaces may act as reservoirs for constant lubricant supply.

While particular embodiments of the invention have been illustrated and described, it will be noted by those skilled in the art that various changes and modifications may be made without departing from the invention, and it is intended to cover in the appended claims all such modifications and equivalents as fall within the true spirit and scope of the invention.

What is claimed:

1. A cylinder head for an internal combustion engine, comprising:
    (a) A head structure having at least one gas passage provided with a recess for a valve seat insert and a guide bore for a guide sleeve insert;
    (b) sintered powder metal inserts implanted respectively into said valve seat recess and into said guide bore, the internal cylindrical surfaces of said inserts being true with respect to each other within a locational tolerance of 0.001–0.002 inches, and finished to a surface accuracy within a tolerance of 0.002–0.003 inches, the internal cylindrical surfaces of said inserts having open porosity that constitutes 5–22% at said surface area; and
    (c) means to introduce lubricant to the internal cylindrical surfaces of said inserts whereby the porosity in said surfaces may act as reservoirs for a constant lubricant supply.

2. The cylinder head as in claim 1, in which said inserts are each comprised of an iron-based material.

3. The cylinder head as in claim 1, in which the powder metal inserts are sintered from a coarse powder supply having an average size in the range of 30–90 microns.

* * * * *